Feb. 19, 1952      P. W. JOHNSON      2,586,053
ANALYZER GAUGE
Filed Sept. 24, 1946
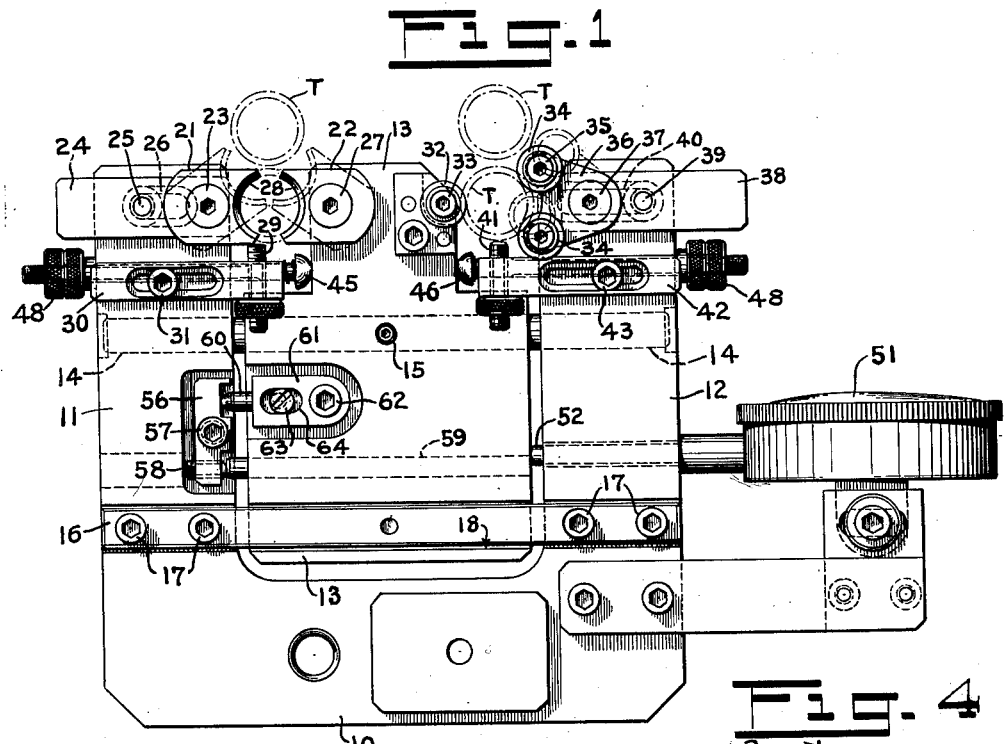
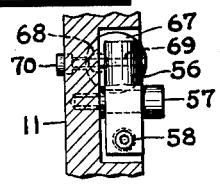
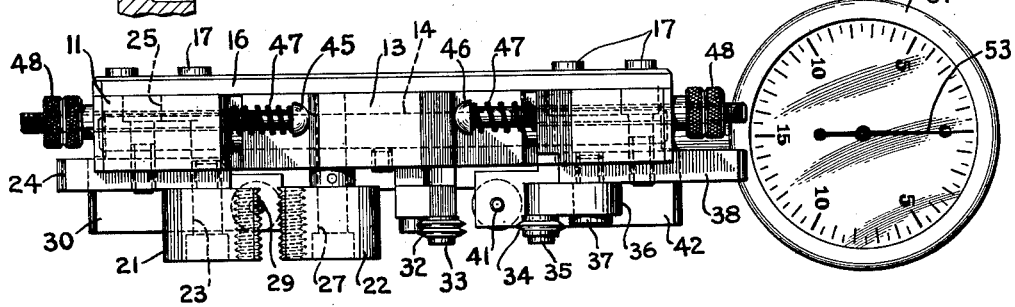
INVENTOR.
PAUL W. JOHNSON
BY
ATTORNEYS Patented Feb. 19, 1952

2,586,053

UNITED STATES PATENT OFFICE 2,586,053

ANALYZER GAUGE

Paul W. Johnson, Bloomfield, Conn., assignor to The Johnson Gage Company, Bloomfield, Conn., a corporation of Connecticut Application September 24, 1946, Serial No. 698,955

15 Claims. (Cl. 33—199)

The invention relates to an analyzer gage with which a test part and particularly a screw thread may be gaged as to its overall assemble-ability, and also with respect to its pitch diameter and concentricity. The gage is intended primarily for testing a screw thread, although it may be used for cylindrical parts as well.

It is an object of the invention to construct a new and novel analyzer gage.

Another object is to construct a gage which tests a part for its overall assemble-ability as well as with respect to its concentricity and diameter, utilizing a single indicator.

A still further object is to construct a gage for testing the concentricity and diameter of a test part, which gage contacts the test part at less than a diameter thereof and amplifies the movement of one of the gage elements to compensate therefor. In addition the leverage or amplifying means may be adjustable to vary the leverage ratio or the amount of amplification of the movement transmitted to an indicator.

Other objects of the invention may be more apparent from the following description when taken in connection with the accompanying drawings illustrating a preferred form thereof, with two forms of adjusting means for the leverage means.

Figure 1 is a side elevation of the gage showing a test part in gaging position and also showing the gaging means in open position in dot-and-dash lines.

Figure 2 is a top view of the gage.

Figure 3 is a partial view in section of the gage showing another adjusting means for varying the leverage ratio.

Figure 4 is a partial side view showing the adjusting means of Figure 3.

The gage includes a frame or frame member 10 having a pair of spaced supports 11 and 12. Between the spaced supports is a movable member 13 which may be mounted in any suitable fashion for movement with respect to the supports or frame. The mounting means illustrated utilizes a bar 14 which passes through the movable member 13 and is secured thereto by a screw 15. The ends of the bar are slidable in a hole in each of the supports 11 and 12. A pair of guide bars 16 may be secured on each side of the frame by screws 17 and the movable member 13 carries a slide groove 18 on each side thereof for additionally guiding the movable member.

A pair of cooperating gaging means 21 and 22 has one gaging means 21 carried by the support 11 and the other 22 carried by the movable member. The gaging means particularly shown are segmental, that is the gaging surface 28 on each gaging means is approximately a little less than a semicircle so that any fault in the test part will affect the indicator reading. These gaging means therefore test for overall ability of the test part to assemble with the hole, threaded or plain with which it is to be assembled. This gaging means forms a snap type of ring gage for testing the part as to overall assemble-ability. This gaging means is relatively long to engage a substantial length of the test part T and if the latter is a screw thread it would carry a plurality of thread engaging grooves or ridges. Suitable means such as friction washers may be provided to retain the gaging means in open position.

The gaging means 21 is mounted upon a pivot 23 carried by an adjusting slider 24 which is slidable in a groove in the support 11. The adjusting slider carries a locking screw 25 which passes through an elongated slot 26 in the support to adjust the position of the gaging means. The gaging means 22 is also mounted upon a pivot 27 carried by the movable member 13. The pivoted gaging means 21 and 22 may be removed and other gaging segments mounted upon the pivots 23 and 27 respectively for gaging different sizes of test parts.

A screw stop 29 may be provided to engage the gaging segment 21 to limit its downward movement to gaging position. The stop is carried by an adjustable slider 30 carried by the support 11 for adjusting the position of the stop. The stop may be engaged by the test part if desired however its engagement with the segment is more desirable since any possibility of mutilation of a screw thread is avoided. The gaging segment or means 22 is held in gaging position by the test part, and hence does not need a stop. The slider 30 is held in adjusted position by a screw 31.

The analyzing gage includes a second pair of gaging means which may include a gaging roller 32 mounted upon a pivot 33 carried by the movable member 13. A cooperating gaging means may include a pair of rollers 34 rotatably mounted upon pivots 35 carried by a swinging frame 36. This swinging frame is mounted upon a pivot 37 carried by an adjusting slider 38 which is mounted in a groove in the frame or support 12 and is secured to the support by a screw 39 passing through a slot 40 in the support. The two gaging means may be replaced by other gaging means to gage test parts of different diameters, and adjustment of the spacing between the gaging means being obtained by the slider 38. The gaging rollers 32 and 34 may be narrow for gaging the diameter of a test part. If the test part is a screw thread, the rollers will carry not over three thread ribs to gage the pitch diameter of a thread, the gaging rollers 34 being shown with one thread engaging rib and the roller 32 being shown with two engaging ribs. The gaging roller 32 and the pair of gaging rollers 34 engage three points on the periphery of the test part and hence is affected by any eccentricity in the test part. It is clear that the roller 32 may be replaced by a swinging frame 36 with its two gaging rollers in which case a four point contact is obtained with the test part.

A screw stop 41 carried upon an adjustable slider 42 may engage the test part or the swinging frame 36 in order to limit the movement of the test part to gaging position as determined by a line through the center of the roller 32 and the center of the pivot 37. The slider is held in adjusted position by a screw 43.

Means may be provided to center the movable member 13 between the supports 11 and 12. Any suitable means may be utilized, that shown including pins 45 and 46 engaging a shoulder or abutment on the movable member. Springs 47 propel the pin 45 to the right and the pin 46 to the left, so that the movable member is floated between the supports. Nuts 48 upon the respective pins 45 and 46 may be used to adjust the limiting position of the pins and hence the center position of the movable member.

A single indicator 51 may be used to indicate a reading for both pairs of gaging means. It may be carried by the frame or frame member 10 or the movable member 13, the indicator being shown as carried by the frame member. The operating pin 52 of the indicator engages the other member which means that as illustrated with the indicator carried by the frame member the indicator operating pin abuts the movable member. Any movement of the movable member 13 to the right directly moves the operating pin 52 to move the indicator pointer 53 and thereby indicate the deviation of the test part from the exact dimension desired.

The gaging means for testing the pitch diameter, comprising the roller 32 and the rollers 34 mounted upon the swingable frame 36, engage the test part at three points in order to test for concentricity as well as to test for diameter or pitch diameter. The gaging rollers 34 therefore engage the test part T at two spaced points peripherally thereof and at less than a diameter so that the indicator reading of the test part would be less than a diametrical reading which is desired. It is for this reason that leverage means is utilized to amplify the extent of movement of the movable member 13 when gaging a test part in the pitch diameter gazing means. This leverage means includes a lever 56 pivotally mounted upon the pivot 57 which is secured to one of the members and as illustrated, the frame 10 or the support 11 of the frame carries the lever. The lever has an adjusting screw 58 which engages a push rod 59 slidably mounted in the movable member and the end of which push rod engages the operating pin 52 of the indicator 51.

The lever 56 is operated by movement of the movable member 13 to the left. A pin 60, carried by the movable member, engages the lever 56 so that upon movement of the movable member to the left, the lever 56 is turned upon its pivot 57 and the push rod 59 is propelled to the right to move the operating pin 52 of the indicator. Since the pitch diameter gaging means may be removed and others substituted for testing the diameters of different sizes of test parts, means are provided to adjust the leverage ratio or amplification of movement of the movable member 13. The pin 60 therefore may be carried by a holder 61 which is mounted upon a pivot 62 secured to the movable member. An eccentric 63 operating in a slot 64 in the holder adjusts the point of contact of the pin 60 with the lever 56 with respect to the lever pivot 57. This changes the leverage or arm ratio from the point of contact of the pin 60 to the center of the pivot 57 as compared to the length of arm between the center of the pivot 57 and the screw 58 or push rod 59. Changing the lever arm ratio changes the extent of amplification of the movement of the movable member which is transmitted to the indicator.

Another form of leverage means is illustrated in Figures 3 and 4. In this construction an eccentric plate 67 is carried by or integral with a pin 68 which is mounted in the movable member 13 and offset with respect to the lever 56. The eccentric plate carries a V or V-ridge 69 which engages the lever 56. The eccentric plate 67 may be turned, which changes the angle of the V-ridge 69 and hence the point of engagement of the latter with the lever 56, and thereby changes the leverage ratio. The eccentric plate may be held in adjusted position by a screw 70.

It should be noted that it is immaterial whether the frame member 10 or the movable member 13 carries the lever 56. If one member carries the lever then the other member carries the engaging pin 60, or the eccentric plate 67. In either case the operation is the same. With the leverage means carried by the frame a lever of the first class is used in which the propelling pin 60 is on one side of the pivot and the propelled push rod 59 is on the other side.

The gage is used to determine whether or not a test part is within the allowable tolerances as to its ability to assemble with its mating part and as to its diameter. A test part T is inserted into the segmental gaging means 21 and 22 until the stop 29 is engaged. The movable member 13 moves to the right and propels the indicator operating pin 52 to the right which movement swings the pointer 53 over the dial. Assume that the gage has been set to register 5 for the exact size, therefore if the pointer moves to 3 the test part is two units under the exact dimension although it would be within the allowable tolerances or deviation if a plus or minus tolerance of 3 is allowed. That is any reading between 2 and 8 is satisfactory. If the pointer moves to 10 on the dial then the test part is oversize for the tolerance limits specified above. The test part may be rotated in gaging position if thought necessary to bring the entire circumference thereof into contact with the gaging surfaces. The test part is then removed from between the gaging means and they remain in open position to receive a second test part.

If the test part is within the allowable tolerances, it is then inserted between the gaging means 32 and 34. The movable member 13 moves to the left and the pin 60 swings the lever 56, which moves the push rod 59 to the right. The push rod propels the operating pin 52 of the indicator which swings the pointer 53 over the dial and again indicates whether or not the test part is within the allowable tolerances or dimensions for concentricity and diameter. Upon removal of the test part, the swinging frame 36 remains in open position to receive a second test part.

This invention is presented to fill a need for improvements in an analyzer gage. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage for gaging a test part of circular cross section comprising a frame member having a support, a movable member carried by the frame member and movable toward and away from the support, a pair of cooperating gaging means one of the pair being mounted upon a support and the other on the movable member to shift the position of the latter, the cooperating gaging means being spaced apart to receive a test part therebetween, at least one of the gaging means of the pair engaging a test part at two spaced points peripherally thereof and at less than a diameter thereof, an indicator carried by one member having an external operating pin and actuated upon movement of the movable member, and leverage means connected between the movable member and the operating pin of the indicator to amplify the movement of the movable member transmitted to the indicator.

2. A gage for gaging a test part of circular cross section comprising a frame, a movable member mounted upon the frame and movable relatively to the latter, a pair of cooperating gaging means one of the pair being mounted upon the frame and the other being mounted on the movable member to shift the position of the latter relatively to the frame upon insertion of a test part, the cooperating gaging means being spaced apart to receive a test part therebetween, at least one of the gaging means of the pair engaging a test part at two spaced points peripherally thereof and at less than a diameter thereof, an indicator carried by one member and having an external operating pin, and leverage means operatively connecting the movable member and the operating pin of the indicator to amplify the movement of the former as transmitted to the indicator.

3. A gage for gaging a test part of circular cross section comprising a frame, a movable member mounted upon the frame and movable relatively to the latter, a pair of cooperating gaging means one of the pair being mounted upon the frame and the other being mounted on the movable member to shift the position of the latter relatively to the frame, the cooperating gaging means being spaced apart to receive a test part therebetween, at least one of the gaging means of the pair engaging a test part at two spaced points peripherally thereof and at less than a diameter thereof, an indicator engaging the movable member and having an external operating pin, and, leverage means operatively connecting the movable member and the operating pin of the indicator to amplify the movement of the former as transmitted to the indicator, including means to adjust the leverage means to vary the extent of movement transmitted to the operating pin of the indicator.

4. A gage for gaging a test part of circular cross section comprising a frame member having a pair of spaced supports, a movable member carried by the frame member between the spaced supports and movable toward and away from the supports, a pair of cooperating gaging means one of the pair being mounted upon a support and the other on the movable member to shift the position of the latter in one direction, a second pair of cooperating gaging means one of the pair being mounted on the movable member to shift the position of the latter in the opposite direction, the second pair of cooperating gaging means being spaced apart to receive a test part therebetween one of the gaging means of the second pair engaging a test part at two spaced points peripherally thereof and at less than a diameter thereof, a single indicator carried by one member and engaging the other member and actuated upon movement of the movable member in one direction, and leverage means connecting the movable member and the indicator upon movement of the former in the other direction to amplify the movement thereof and indicate the same on the indicator.

5. A gage for gaging a test part of circular cross section comprising a frame having a pair of spaced supports, a movable member carried by the frame between the spaced supports and movable toward and away from the supports, a pair of cooperating gaging means one of the pair being mounted upon a support and the other on the movable member to shift the position of the latter in one direction, a second pair of cooperating gaging means one of the pair being mounted upon the other support and the other being mounted on the movable member to shift the position of the latter in the opposite direction, the second pair of cooperating gaging means being spaced apart to receive a test part therebetween, at least one of the gaging means of the second pair engaging a test part at two spaced points peripherally thereof and at less than a diameter thereof, a single indicator carried by the frame and engaging the movable member and actuated thereby upon movement in one direction, and leverage means between the movable member and the indicator to amplify the movement of the former as transmitted to the indicator and actuator by the movement of the movable member in the opposite direction.

6. A gage for gaging a test part of circular cross section comprising a frame having a pair of spaced supports, a movable member carried by the frame between the spaced supports and movable toward and away from the supports, a pair of cooperating gaging means one of the pair being mounted upon a support and the other on the movable member to shift the position of the latter in one direction, a second pair of cooperating gaging means one of the pair being mounted upon the other support and the other gaging means being mounted on the movable member to shift the position of the latter in the opposite direction, the second pair of cooperating gaging means being spaced apart to receive a test part therebetween, at least one of the gaging means of the second pair engaging a test part at two spaced points peripherally thereof and at less than a diameter thereof, a single indicator carried by the frame and engaging the movable member, leverage means between the movable member and the indicator to amplify the movement of the former and indicate the same on the indicator and actuated by the movement of the movable member in the opposite direction, and means to adjust the leverage means to vary the amplification of movement transmitted to the indicator.

7. A gage for gaging a test part of circular cross section comprising a frame member having a pair of spaced supports, a movable member carried by the frame member between the spaced supports and movable toward and away from the supports, a pair of cooperating gaging means one of the pair being mounted upon a support and the other on the movable member to shift the position of the latter in one direction, a second pair of cooperating gaging means one of the pair being mounted on the other support and the other of the pair being mounted on the movable member to shift the position of the latter in the opposite direction, the second pair of cooperating gaging means being spaced apart to receive a test part therebetween, one of the gaging means of the second pair engaging a test part at two spaced points peripherally thereof and at less than a diameter thereof, a single indicator carried by one member and engaging the other member and actuated upon movement of the movable member in one direction, and leverage means between the movable member and the indicator to amplify the movement of the former in the other direction transmitted to the indicator, and means to adjust the leverage means to vary the amplification of movement transmitted to the indicator.

8. A gage for gaging a test part of circular cross section comprising a frame having a pair of spaced supports, a movable member carried by the frame between the spaced supports and movable toward and away from the supports, a pair of cooperating gaging means one of the pair being mounted upon one of said supports and the other on the movable member to shift the position of the latter in one direction, a second pair of cooperating gaging means one of the pair being mounted on the other support and the other of the pair being mounted on the movable member to shift the position of the latter in the opposite direction, the second pair of cooperating gaging means being spaced apart to receive a test part therebetween, one of the gaging means of the second pair engaging a test part at two spaced points peripherally thereof and at less than a diameter thereof, a single indicator engaging the movable member so that it is actuated thereby upon movement of the latter in at least one direction, a push rod slidable upon the movable member and engaging the indicator, leverage means operatively connecting the movable member and the push rod to amplify the movement of the former transmitted through the push rod to the indicator, and means to adjust the leverage means to vary amplification of movement transmitted to the indicator.

9. A gage for gaging a test part of circular cross section comprising a frame member having a support, a movable member carried by the frame member and movable toward and away from the support, a pair of cooperating gaging means one of the pair being mounted upon the support and the other on the movable member to shift the position of the latter in one direction, the cooperating gaging means being spaced apart to receive a test part therebetween, the gaging means engaging a test part at two spaced points peripherally thereof and at less than a diameter thereof, an indicator carried by one member and having an external operating pin, a pivot carried by one member, a lever carried by the pivot and actuated by movement between the members to amplify the movement of the movable member transmitted to the operating pin of the indicator.

10. A gage for gaging a test part of circular cross section comprising a frame member having a support, a movable member carried by the frame member and movable toward and away from the support, a pair of cooperating gaging means one of the pair being mounted upon the support and the other on the movable member to shift the position of the latter, the cooperating gaging means being spaced apart to receive a test part therebetween, the gaging means engaging a test part at two spaced points peripherally thereof and at less than a diameter thereof, an indicator carried by one member and having an external operating pin, a pivot carried by one member, a lever carried by the pivot and actuated by movement between the members to amplify the movement of the movable member transmitted to the indicator, and adjustable means carried by the other member and engaging the pivoted lever and adjustable with respect to the point of engagement therewith in relation to the pivot to vary the extent of movement transmitted to the operating pin of the indicator.

11. A gage for gaging a test part of circular cross section comprising a frame member having a pair of spaced supports, a movable member carried by the frame member between the spaced supports and movable toward and away from the supports, a pair of cooperating gaging means one of the pair being mounted upon a support and the other on the movable member to shift the position of the latter in one direction, a second pair of cooperating gaging means one of the pair being mounted on the other support and the other of the pair being mounted on the movable member to shift the position of the latter in the opposite direction, the second pair of cooperating gaging means being spaced apart to receive a test part therebetween, one of the gaging means of the second pair engaging a test part at two spaced points peripherally thereof and at less than a diameter thereof, a single indicator carried by one member and engaging the other member and actuated upon movement between the members in one direction, a pivot carried by one member, a lever carried by the pivot and connected with the indicator, to amplify the movement of the movable member transmitted to the indicator, and adjustable means carried by the other member and engaging the pivoted lever and adjustable with respect to the point of engagement therewith in relation to the pivot to vary the extent of movement of the lever and the movement of the indicator.

12. A gage for gaging a test part of circular cross section comprising a frame having a pair of spaced supports, a movable member carried by the frame between the spaced supports and movable toward and away from the supports, a pair of cooperating gaging means one of the pair being mounted upon a support and the other on the movable member to shift the position of the latter in one direction, a second pair of cooperating gaging means one of the pair being mounted on the other support and the other of the pair being mounted on the movable member to shift the position of the latter in the opposite direction, the second pair of cooperating gaging means being spaced apart to receive a test part therebetween, one of the gaging means of the second pair engaging a test part at two spaced points peripherally thereof and at less than a diameter thereof, a single indicator carried by the frame and engaging the movable member and actuated upon movement of the movable member in one direction, a push rod slidable upon the movable member and engaging the indicator, a pivot carried by the frame, and a lever carried by the pivot and operated by movement of the movable member in the opposite direction, the lever amplifying the movement of the movable member and engaging the push rod to transmit this movement to the indicator.

13. A gage for gaging a test part of circular cross section comprising a frame having a pair of spaced supports, a movable member carried by the frame between the spaced supports and movable toward and away from the supports, a pair of cooperating gaging means one of the pair being mounted upon a support and the other on the movable member to shift the position of the latter in one direction, a second pair of cooperating gaging means one of the pair being mounted on the other support and the other of the pair being mounted on the movable member to shift the position of the latter in the opposite direction, the second pair of cooperating gaging means being spaced apart to receive a test part therebetween, one of the gaging means of the second pair engaging a test part at two spaced points peripherally thereof and at less than a diameter thereof, a single indicator carried by the frame and engaging the movable member and actuated upon movement of the movable member in one direction, a push rod slidable upon the movable member and engaging the indicator, a pivot carried by the frame, a lever carried by the pivot and amplifying the movement of the movable member and engaging the push rod to transmit this movement to the indicator, and adjustable means carried by the movable member and engaging the pivoted lever and adjustable with respect to the point of engagement therewith in relation to the pivot to vary the amplification of movement transmitted to the indicator.

14. A gage for gaging a test part of circular cross section comprising a frame having a pair of spaced supports, a movable member carried by the frame between the spaced supports and movable toward and away from the supports, a pair of cooperating gaging means one of the pair being mounted upon a support and the other on the movable member to shift the position of the latter in one direction, a second pair of cooperating gaging means one of the pair being mounted on the movable member to shift the position of the latter in the opposite direction, the second pair of cooperating gaging means being spaced apart to receive a test part therebetween, one of the gaging means of the second pair engaging a test part at two spaced points peripherally thereof and at less than a diameter thereof, a single indicator carried by the frame and engaging the movable member and actuated upon movement of the movable member in one direction, a push rod slidable upon the movable member and engaging the indicator, a pivot carried by the frame, a lever carried by the pivot and amplifying the movement of the movable member and engaging the push rod to transmit this movement to the indicator, and adjustable means carried by the movable member and engaging the pivoted lever and adjustable with respect to the point of engagement therewith in relation to the pivot to vary the amplification of movement transmitted to the indicator including a pivoted lever, and means to adjust the position of the lever.

15. A gage for gaging a test part of circular cross section comprising a frame having a pair of spaced supports, a movable member carried by the frame between the spaced supports and movable toward and away from the supports, a pair of cooperating gaging means one of the pair being mounted upon a support and the other on the movable member to shift the position of the latter in one direction, a second pair of cooperating gaging means one of the pair being mounted on the movable member to shift the position of the latter in the opposite direction, the second pair of cooperating gaging means being spaced apart to receive a test part therebetween, one of the gaging means of the second pair engaging a test part at two spaced points peripherally thereof and at less than a diameter thereof, a single indicator carried by the frame and engaging the movable member and actuated upon movement of the movable member in one direction, a push rod slidable upon the movable member and engaging the indicator, a pivot carried by the frame, a lever carried by the pivot and amplifying the movement of the movable member and engaging the push rod to transmit this movement to the indicator, and adjustable means carried by the movable member and engaging the pivoted lever and adjustable with respect to the point of engagement therewith in relation to the pivot to vary the amplification of movement transmitted to the indicator including an eccentric plate having a rib engaging the pivoted lever, and a pivot means carried by the movable member and offset with respect to the lever and rotatably mounting the eccentric plate upon the movable member.

PAUL W. JOHNSON.

REFERENCES CITED

The following references are of record in the file of this patent:

UNITED STATES PATENTS

| Number | Name | Date |
| --- | --- | --- |
| 1,184,399 | Wheeler | May 23, 1916 |
| 1,390,432 | Douglas | Sept. 13, 1921 |
| 1,547,514 | Mueller | July 28, 1925 |
| 2,027,217 | Zerkle | Jan. 7, 1936 |
| 2,080,534 | Darlington | May 18, 1937 |
| 2,258,760 | Hecker | Oct. 14, 1941 |
| 2,359,869 | Moore | Oct. 10, 1944 |
| 2,412,127 | Cooke | Dec. 3, 1946 |
| 2,432,160 | Johnson | Dec. 9, 1947 |
| 2,433,516 | Johnson | Dec. 30, 1947 |

FOREIGN PATENTS

| Number | Country | Date |
| --- | --- | --- |
| 552,634 | Great Britain | Apr. 16, 1943 |
| 555,624 | Germany | July 25, 1932 |
| 875,563 | France | Sept. 28, 1942 |